United States Patent
Liu et al.

(10) Patent No.: US 9,004,908 B1
(45) Date of Patent: Apr. 14, 2015

(54) INJECTION MOLDING DEVICE HAVING A VERTICALLY MOVEABLE SLIDER AND A HORIZONTALLY MOVEABLE SLIDER

(71) Applicant: Quanta Computer Inc., Taoyuan Shien (TW)

(72) Inventors: Tsung-Chin Liu, New Taipei (TW); Ying-Huang Liu, Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 14/279,650

(22) Filed: May 16, 2014

(30) Foreign Application Priority Data

Dec. 10, 2013 (TW) .............................. 102145357 A (51) Int. Cl.
  *B29C 45/44* (2006.01)
  *B29L 31/00* (2006.01)

(52) U.S. Cl.
  CPC ........... *B29C 45/44* (2013.01); *B29L 2031/757* (2013.01); *B29C 45/4407* (2013.01)

(58) Field of Classification Search
  CPC .... B29C 45/332; B29C 45/44; B29C 45/4407
  USPC ............................. 425/556, DIG. 58; 264/318
  See application file for complete search history.

(56) References Cited

U.S. PATENT DOCUMENTS

| | | | | |
|---|---|---|---|---|
| 5,603,968 | A * | 2/1997 | Tajiri et al. ..................... | 425/556 |
| 6,116,891 | A * | 9/2000 | Starkey ......................... | 425/556 |
| 7,264,761 | B2 * | 9/2007 | Evans et al. ................. | 264/328.1 |
| 8,142,185 | B1 * | 3/2012 | Li et al. ......................... | 425/556 |

* cited by examiner

*Primary Examiner* — Tim Heitbrink
(74) *Attorney, Agent, or Firm* — Rabin & Berdo, Jr.

(57) ABSTRACT

An injection-molding device includes a male part, a female part, a vertically-moveable slider, a horizontally-moveable slider and an elastic element. The female part is detachably engaged with the male part, and an insertion groove is collectively formed by the male part and the female part. The vertically-moveable slider is detachably inserted in the insertion groove, and formed with a first inclined plane. The horizontally-moveable slider is detachably inserted in the insertion groove, formed with a second inclined plane being slidably engaged with the first inclined plane, and a closed cavity is collectively defined by the vertically-moveable slider, the horizontally-moveable slider, the female part and the male part. Two opposite ends of the elastic element are respectively abutted against the vertically-moveable slider and the horizontally-moveable slider.

10 Claims, 13 Drawing Sheets

INJECTION MOLDING DEVICE HAVING A VERTICALLY MOVEABLE SLIDER AND A HORIZONTALLY MOVEABLE SLIDER

RELATED APPLICATIONS

This application claims priority to Taiwan application no. 102145357, filed, Dec. 10, 2013, the entirety of which is incorporated herein by reference.

BACKGROUND

1. Technical Field

The present disclosure relates to a molding device. More particularly, the present disclosure relates to a plastic-injection molding device.

2. Description of Related Art

Figure 1A:
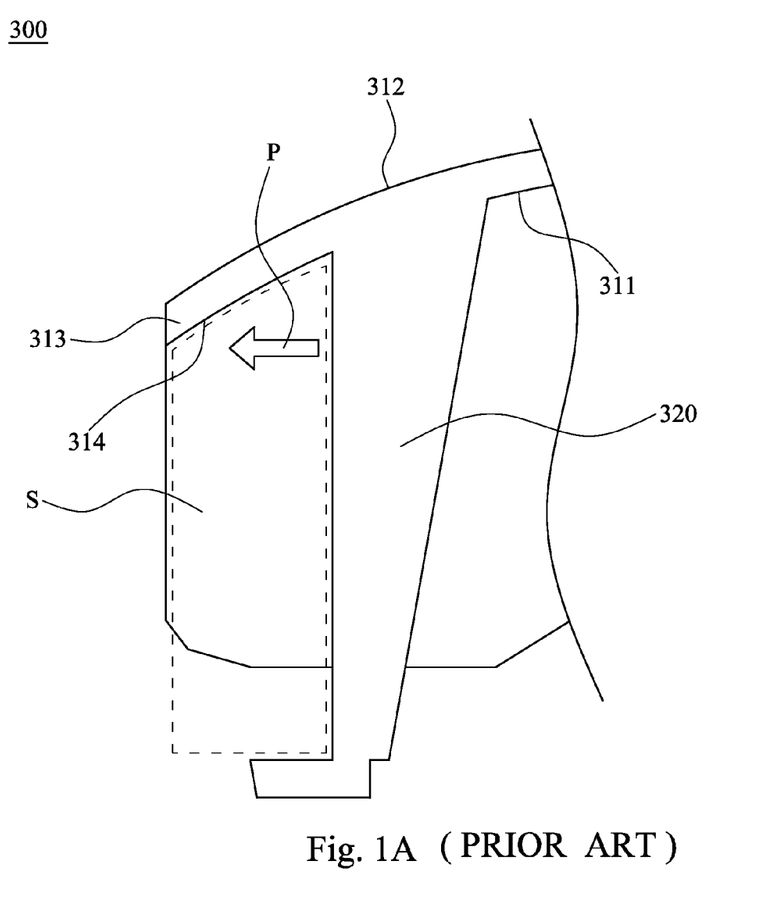
FIG. 1A is a partial side view showing a conventional plastic shell case.

FIG. 1A is a partial side view showing a conventional plastic shell case 300. Generally, as shown in FIG. 1A, an inner surface 311 of a plastic shell case 300 is formed with a buckle member 320. Through the buckle member 320, the plastic shell case 300 can be combined with another plastic shell case (not shown in FIG. 1A).

However, as shown in FIG. 1A, because an outer surface 312 of the plastic shell case 300 is formed as a convex surface and the portion of the inner surface 311 of the plastic shell case 300 defined from the buckle member 320 to a lateral edge 313 (hereinafter referred as an arc-shaped inner edge 314) of the plastic shell case 300 is formed with the same curvature of the convex surface, after the plastic shell case 300 is formed in a conventional molding device, a slider S of the conventional molding device would be interfered by the arc-shaped inner edge 314 of the plastic shell case 300 and unable to be released from a horizontal direction P.

Figure 1B:
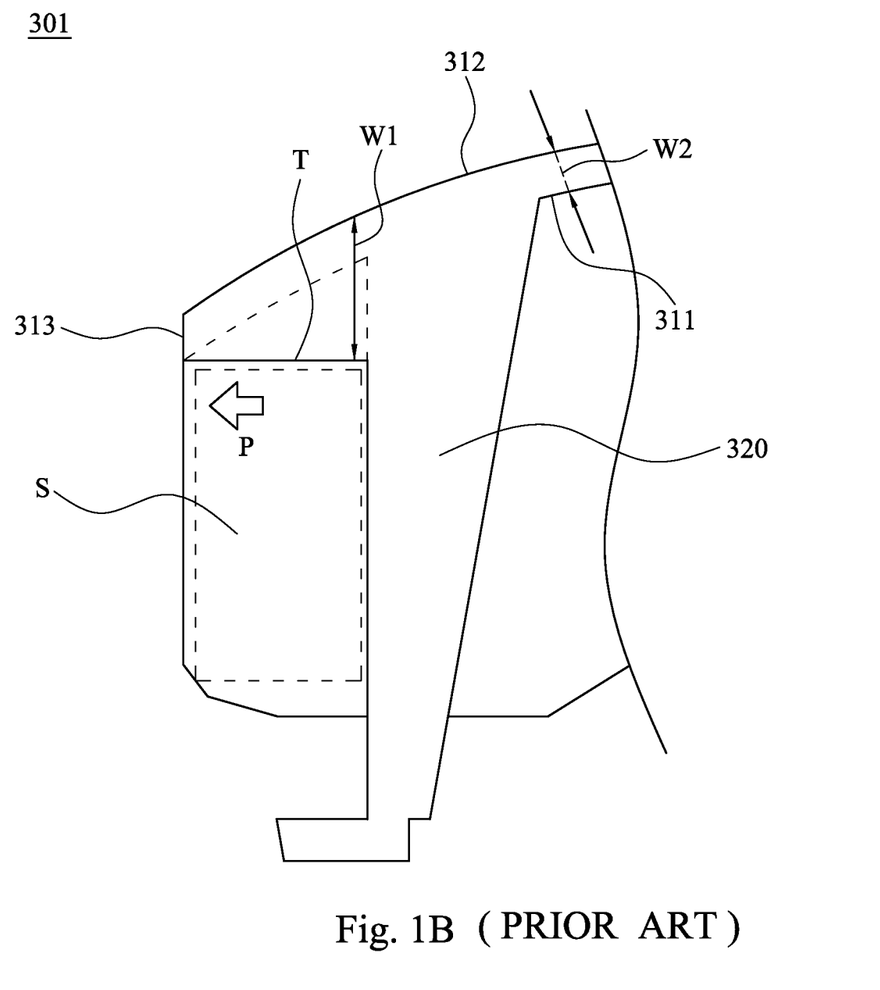
FIG. 1B is a partial side view showing another conventional plastic shell case.

Referring to FIG. 1B, a solution for solving the above-mentioned shortage is to thicken a portion of a plastic shell case 301 defined from the buckle member 320 to the lateral edge 313 of the plastic shell case 301, so the portion of the inner surface 311 of the plastic shell case 301 defined from the buckle member 320 to the lateral edge 313 of the plastic shell case 301 can be formed as a flat surface (marked as T in FIG. 1B), which enables the release of the slider S of the conventional molding device in the horizontal direction P.

However, after the plastic shell case 301 is formed, because the partial thickness W1 of the plastic shell case 301 corresponding to the left side of the buckle member 320 is inconsistent with the partial thickness W2 of the plastic shell case 301 corresponding to the right side of the buckle member 320, the cooling time required for the two partial zones is not the same. As such, a recess may be formed in the partial zone having the greater thickness W1, affecting the appearance of the plastic shell case 301.

SUMMARY

One aspect of the present disclosure is to provide an injection molding device for overcoming the above-mentioned disadvantages existing in the prior art.

According to one embodiment provided by the present disclosure, the injection-molding device includes a male part, a female part, a vertically-moveable slider, a horizontally-moveable slider and an elastic element. The female part is detachably engaged with the male part, and sides of the male part and the female part facing a same direction collectively form an insertion groove thereon. The vertically-moveable slider is detachably inserted in the insertion groove, and formed with a first inclined plane. The horizontally-moveable slider is detachably inserted in the insertion groove, formed with a second inclined plane being slidably engaged with the first inclined plane. The vertically-moveable slider, the horizontally-moveable slider, the female part and the male part combine to form a closed cavity. Two opposite ends of the elastic element are respectively abutted against the vertically-moveable slider and the horizontally-moveable slider.

Thus, after a plastic shell case is formed in the closed cavity and the female part is moved in a first direction to be away from the male part, the elastic element pushes the horizontally-moveable slider in a second direction which is perpendicular to the first direction for allowing the horizontally-moveable slider to be away from the male part, with the horizontally-moveable slider being gradually moved away from the male part, the vertically-moveable slider is gradually moved in a third direction which is opposite to the first direction for being away from an arc-shaped inner edge of the plastic shell case.

As what has been disclosed above, with the injection-molding device provided by the present disclosure, after the plastic shell case is formed, a part of the molding device can be vertically descended from the arc-shaped inner edge of the plastic shell case for being released from the arc-shaped inner edge of the plastic shell case, then the part of the molding device is horizontally moved to make room for a vertical mold releasing path of the buckle member, thereby solving the shortage of the interference caused by the plastic shell case during mold releasing.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The present disclosure will be apparent to those skilled in the art by reading the following detailed description of a preferred embodiment thereof, with reference to the attached drawings, in which.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

As shown in FIG. 1A, the slider S is interfered by the plastic shell case 300 so as to be unable to horizontally move for mold releasing, accordingly, the present disclosure provides an injection-molding device which is formed with a vertical mold releasing path which allows a slider to be vertically descended for being away from an arc-shaped inner edge of a plastic shell case, then to be horizontally moved for being away from a buckle member of the plastic shell case, thus the problem of being interfered by the plastic shell case during mold releasing can be solved.

Figure 2A:
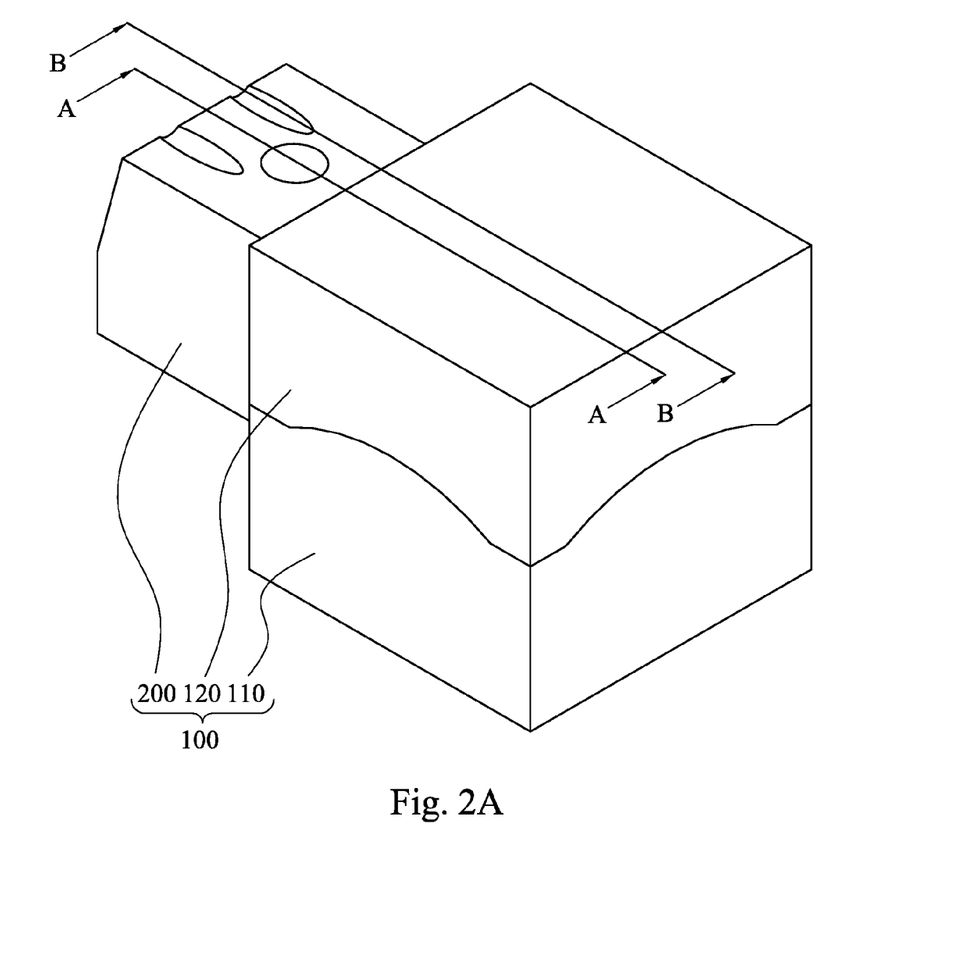
FIG. 2A is a perspective view showing the injection-molding device according to one embodiment of the present disclosure.
Figure 2B:
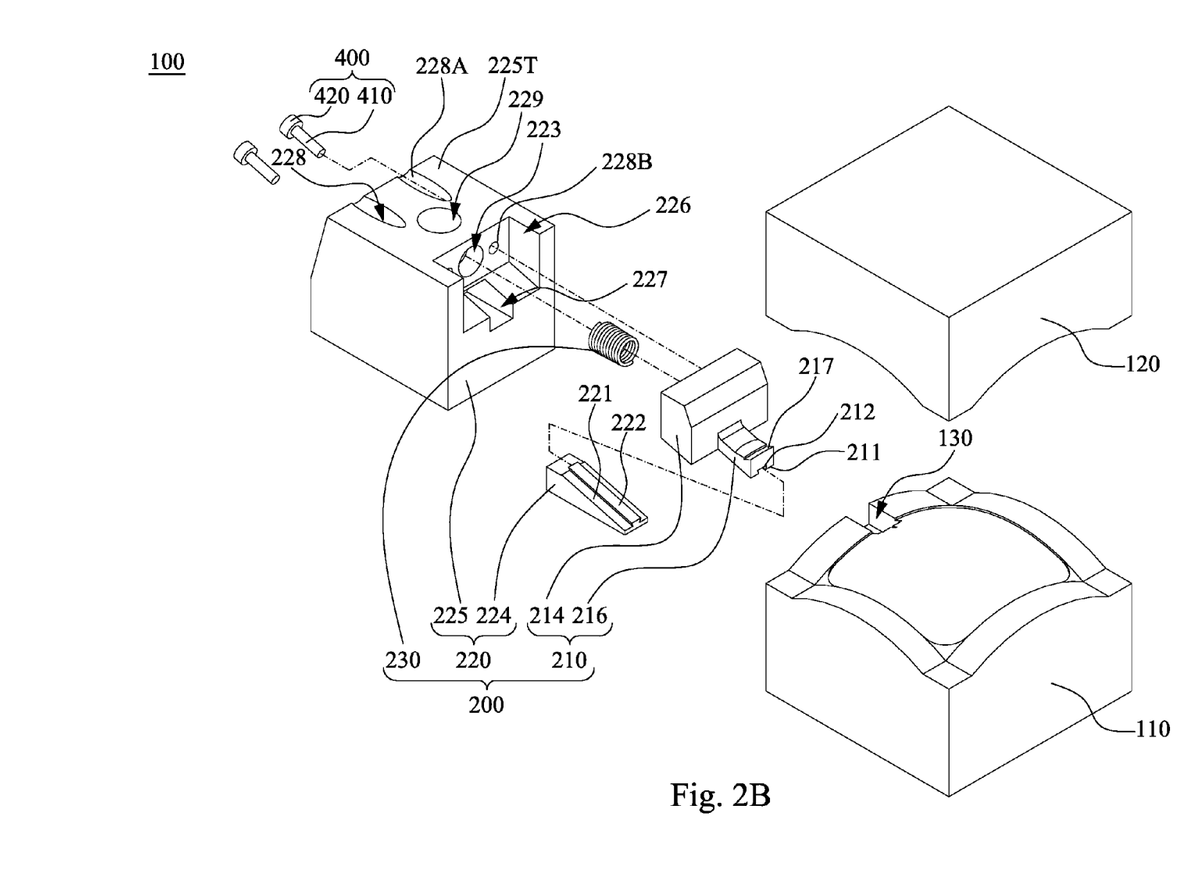
FIG. 2B is an exploded view showing the injection-molding device shown in FIG. 2A.
Figure 3:
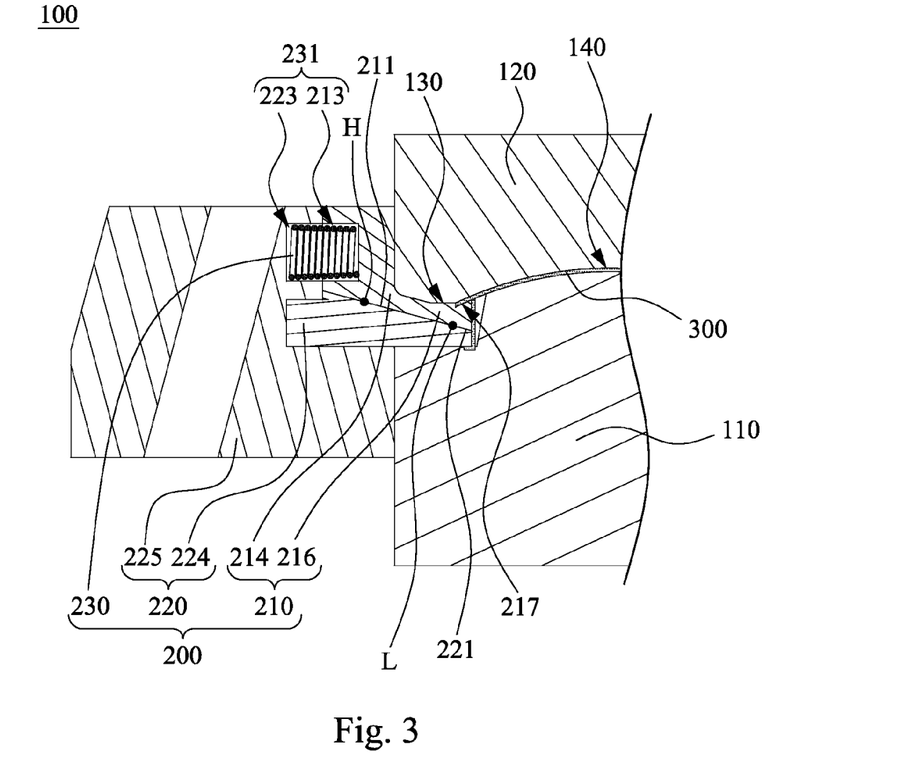
FIG. 3 is a cross sectional view of FIG. 2A taken along line AA.

Reference is now made to FIG. 2A to FIG. 3. FIG. 2A is a perspective view showing the injection-molding device according to one embodiment of the present disclosure, FIG. 2B is an exploded view showing the injection-molding device shown in FIG. 2A, and FIG. 3 is a cross sectional view of FIG. 2A taken along line AA. As shown from FIG. 2A to FIG. 3, the injection-molding device 100 includes a male part 110, a female part 120 and at least a slider set 200. The female part 120 is detachably engaged with the male part 110, and an insertion groove 130 (as shown in FIG. 2B and FIG. 3) is formed at the same sides of the male part 110 and the female part 120 when the male part 110 and the female part 120 are engaged together. The slider set 200 includes a vertically-moveable slider 210, a horizontally-moveable slider 220 and an elastic element 230. Both of the vertically-moveable slider 210 and the horizontally-moveable slider 220 are detachably inserted in the insertion groove 130. The vertically-moveable slider 210 is formed with a first inclined plane 211, the horizontally-moveable slider 220 is formed with a second inclined plane 221, and the second inclined plane 221 is slidably engaged with the first inclined plane 211. Two opposite ends of the elastic element 230 are respectively abutted against the vertically-moveable slider 210 and the horizontally-moveable slider 220. As shown in FIG. 3, when the injection-molding device 100 is in a mold engaged status, a closed cavity 140 is collectively defined by the vertically-moveable slider 210, the horizontally-moveable slider 220, the female part 120 and the male part 110. The interior of the closed cavity 140 is used to form a plastic shell case 300 therein.

Figure 4:
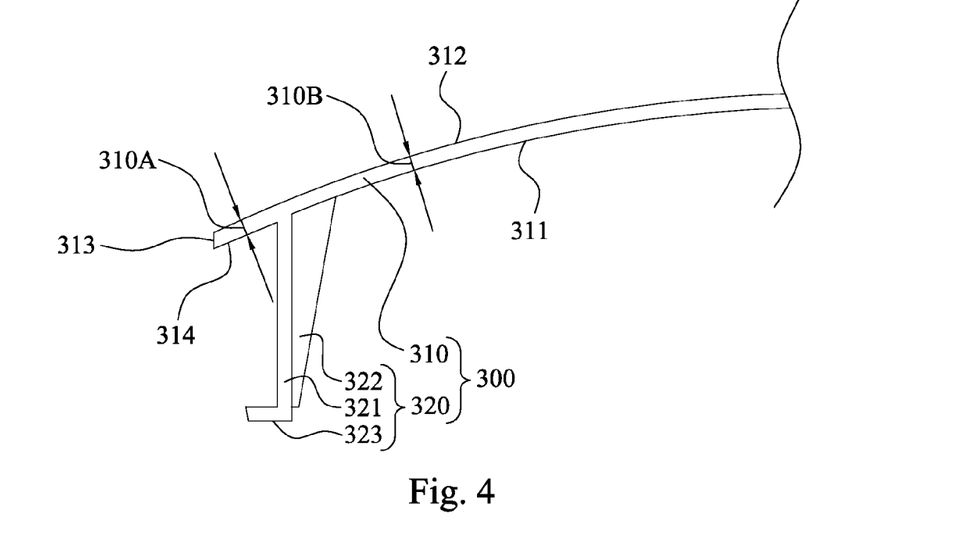
FIG. 4 is a partial side view showing the plastic shell case shown in FIG. 3.

FIG. 4 is a partial side view showing the plastic shell case shown in FIG. 3. As shown in FIG. 4, the plastic shell case 300 includes a shell member 310 and at least a buckle member 320. The shell member 310 is formed with an inner surface 311 and an outer surface 312 opposite to the inner surface 311. The outer surface 312 is formed as a convex surface. The buckle member 320 is formed on the inner surface 311 of the shell member 310 and located close to a lateral edge 313 of the shell member 310. The portion of the inner surface 311 of the shell member 310 defined from the buckle member 320 to the lateral edge 313 of the shell member 310 is formed as an arc-shaped inner edge 314, the arc-shaped inner edge 314 is formed with the same curvature as the convex surface of the outer surface 312. The buckle member 320 includes a columnar body 321, a reinforce rib 322 and a hook 323, one end of the columnar body 321 is connected to the inner surface 311 of the shell member 310, the other end thereof is extended from the inner surface 311 of the shell member 300 towards a direction opposite to the outer surface 312. The reinforce rib 322 is connected to the inner side of the columnar body 321 and the inner surface 311 of the shell member 310. The hook 323 is formed at one end of the columnar body 321 away from the inner surface 311 of the shell member 310, and extended towards a direction away from the reinforce rib 322.

Because the partial thickness 310A of the shell member 310 of the plastic shell case 300 corresponding to the left side of the buckle member 320 is substantially the same as the partial thickness 310B of the shell member 310 of the plastic shell case 300 corresponding to the right side of the buckle member 320, an appearance-related situation caused by the cooling time at the two partial zones being different can be avoided.

It is noted, each buckle member 320 is corresponding to a slider set 200, so the quantity of the slider set 200 is the same as the quantity of the buckle member 320 of the plastic shell case 300, however a slide set 200 is adopted by the present disclosure for illustration, the scope of the injection-molding device 100 provided by the present disclosure is not limited to be formed with only one slider set 200 and the finished product is not limited to be formed with only one buckle member 320.

As shown in FIG. 2B and FIG. 3, the horizontally-moveable slider 220 includes a latch member 224 and a slider body 225. The slider body 225 is respectively connected to the vertically-moveable slider 210 and latch member 224. The vertically-moveable slider 210 is disposed between the slider body 225 and the female part 120. Two opposite ends of the latch member 224 are respectively inserted in the insertion groove 130 and the slider body 225, and the second inclined plane 221 is formed at one side of the latch member 224. In this embodiment, the arrangement of the latch member 224 which detachably assembles with the slider body 225 is only served for illustration, the scope of the present disclosure is not limited to the above-mentioned arrangement, the embedding member can also be integrally formed with the slider body.

In addition, the vertically-moveable slider 210 is formed with a first concave portion 213. The first concave portion 213 is formed at one surface of the vertically-moveable slider 210 opposite to the female part 120. The slider body 225 is formed with a second concave portion 223, the second concave portion 223 is formed at one side of the slider body 225 facing the vertically-moveable slider 210. When the vertically-moveable slider 210 and the slider body 225 are collectively connected, an accommodation space 231 is collectively defined by the second concave portion 223 and the first concave portion 213. The accommodation space 231 is served to accommodate the elastic element 230, in other words when the vertically-moveable slider 210 and the slider body 225 are collectively connected, two opposite ends of the elastic element 230 are respectively abutted against an inner wall of the first concave portion 213 and an inner wall of the second concave portion 223, and the elastic element 230 is clamped and compressed between the vertically-moveable slider 210 and the horizontally-moveable slider 220. For example, the elastic element 230 is a spiral retractable spring or extension spring.

However, the scope of the present disclosure is not limited by the type or the installed location of the elastic element 230, the elastic element 230 can also be an elastic disk or reed; or the elastic element 230 can also be accommodated in the accommodation space 231; or the elastic element 230 can not be disposed between the vertically-moveable slider 210 and the horizontally-moveable slider 220.

As shown in FIG. 2B and FIG. 3, the vertically-moveable slider 210 includes an embedding member 214 and an extension arm 216. The embedding member 214 is inserted in the slider body 225. The extension arm 216 is convexly formed at one side of the embedding member 214 and extended into the insertion groove 130. The first inclined plane 211 is adjacently connected to two opposite ends of the vertically-moveable slider 210, i.e. the first inclined plan 211 is formed at the same sides of the embedding member 214 and the extension arm 216. According to this embodiment, the arrangement of the embedding member 214 being integrally formed with the extension arm 216 is served for illustration, the scope of the present disclosure is not limited to the above-mentioned arrangement, the embedding member and the extension arm can also be detachably assembled.

According to this embodiment, one side of the slider body 225 facing the vertically-moveable slider 210 is further formed with a first concave slot 226 and a second concave slot 227 (as shown in FIG. 2B). The second concave slot 227 is served to receive one end of the latch member 224 and is communicated with the first concave slot 226. The first concave slot 226 is served to receive a part of the vertically-moveable slider 210 (i.e. the embedding member 214), and is communicated with the second concave portion 223. The embedding member 214 is detachably inserted in the first concave slot 226. In addition, the vertically-moveable slider 210 is further formed with a recess portion 217. The recess portion 217 is formed at one end of the extension arm 216 being away from the embedding member 214. When the plastic shell case 300 is formed in the closed cavity 140 which is in a mold engaged status, the arc-shaped inner edge 314 (as shown in FIG. 4) of the plastic shell case 300 is complementary with the recess portion 217, and is in contact with the recess portion 217.

As shown in FIG. 3, the second inclined plane 221 of the horizontally-moveable slider 220 is collectively engaged with the first inclined plane 211 of the vertically-moveable slider 210, and the second inclined plane 221 of the horizontally-moveable slider 220 and the first inclined plane 211 of the vertically-moveable slider 210 are both formed with a low point L and a high point H, wherein the low point L is relatively closer to the closed cavity 140. As shown in FIG. 2B, the first inclined plane 211 of the vertically-moveable slider 210 is formed with a first guiding portion 212. The second inclined plane 221 of the horizontally-moveable slider 220 is formed with a second guiding portion 222, the first guiding portion 212 is complementary to the second guiding portion 222, and is slidably engaged with the second guiding portion 222. Thus, through the first guiding portion 212 being collectively engaged with the second guiding portion 222, the first inclined plane 211 of the vertically-moveable slider 210 is able to stably and reciprocally slide on the second inclined plane 221 of the horizontally-moveable slider 220.

According to this embodiment and as shown in FIG. 2B, the first guiding portion 212 is formed as dovetail slot, and the second guiding portion 222 is formed as a dovetail tenon. However, the scope of the present disclosure is limited by the type of the first guiding portion and the second guiding portion, so the first guiding portion and the second guiding portion can also be a combination of a sliding slot and a sliding rail.

Figure 5:
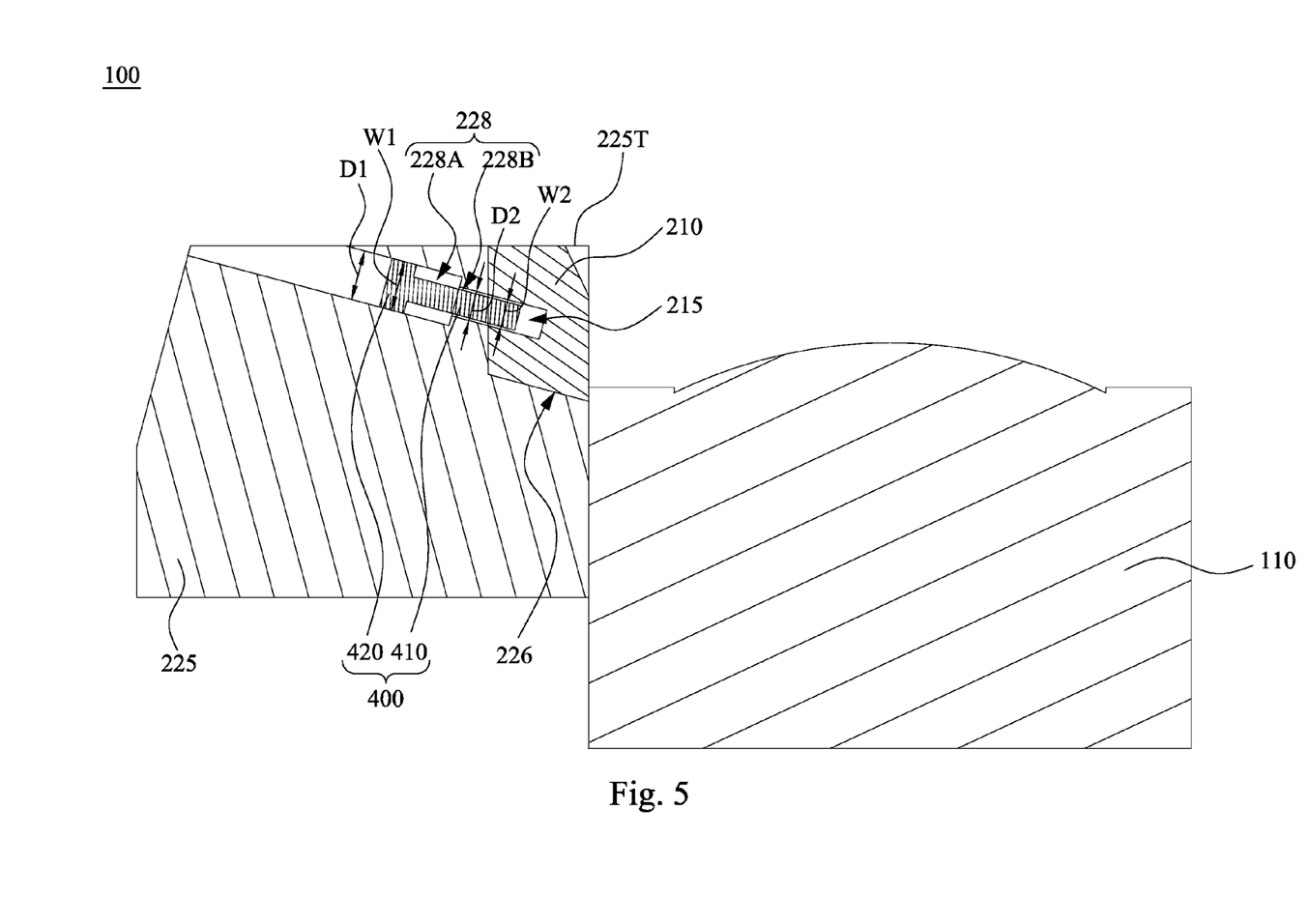
FIG. 5 is a cross sectional view of FIG. 2A taken along line BB.

Referring to FIG. 5, which is a cross sectional view of FIG. 2A taken along line BB. As shown in FIG. 2B and FIG. 5, the injection-molding device 100 further includes at least a position limiting rod 400. According to this embodiment, the quantity of the position limiting rod 400 is two, and the two position limiting rods 400 are arranged in parallel, what shall be addressed is that the scope of the present disclosure is not limited by the quantity of the position limiting rod 400. Each of the position limiting rods 400 is obliquely disposed in the vertically-moveable slider 210 and the slider body 225, for example the slope of the position limiting rod 400 is the same as the slope of the second inclined plane 221. One end of the position limiting rod 400 is fixedly connected to the vertically-moveable slider 210, and the other end thereof is moveably limited in the slider body 225. Thus, by the connection of the position limiting rod 400, the vertically-moveable slider 210 can be prevented from being released from the slider body 225, and can be moved with the slider body 225. The position limiting rod 400 is formed with a rod body 410 and a rod head 420. The rod head 420 is formed at one end of the rod body 410, and the cross sectional width W1 of the rod head 420 is greater than the cross sectional width W2 of the rod body 410.

The slider body 225 is formed with a first pin slot 228. The first pin slot 228 is obliquely formed in the slider body 225 thereby allowing a top surface 225T of the slider body 225 and the first concave slot 226 to be communicated. The first pin slot 228 is formed with a first segment 228A and a second segment 228B. The first segment 228A is exposed on the top surface 225T of the slider body 225, the second segment 228B is exposed in the first concave slot 226, and the diameter D2 of the second segment 228B is smaller than the diameter D1 of the first segment 228A and the cross sectional width W1 of the rod head 420. The vertically-moveable slider 210 is formed with a second pin slot 215, the first pin slot 228 and the second pin slot 215 are coaxial, and the first pin slot 228 is communicated with the second segment 228B of the first pin slot 228. One end of the rod body 410 opposite to the rod head 420 is secured (e.g. screw-fitted) in the second pin slot 215, and the rod head 420 is moveably limited in the first segment 228A. Because the cross sectional width W1 of the rod head 420 is larger than the diameter D2 of the second segment 228B, the rod head 420 can reciprocally move in the first segment 228A and cannot move into the second segment 228B.

Figure 6:
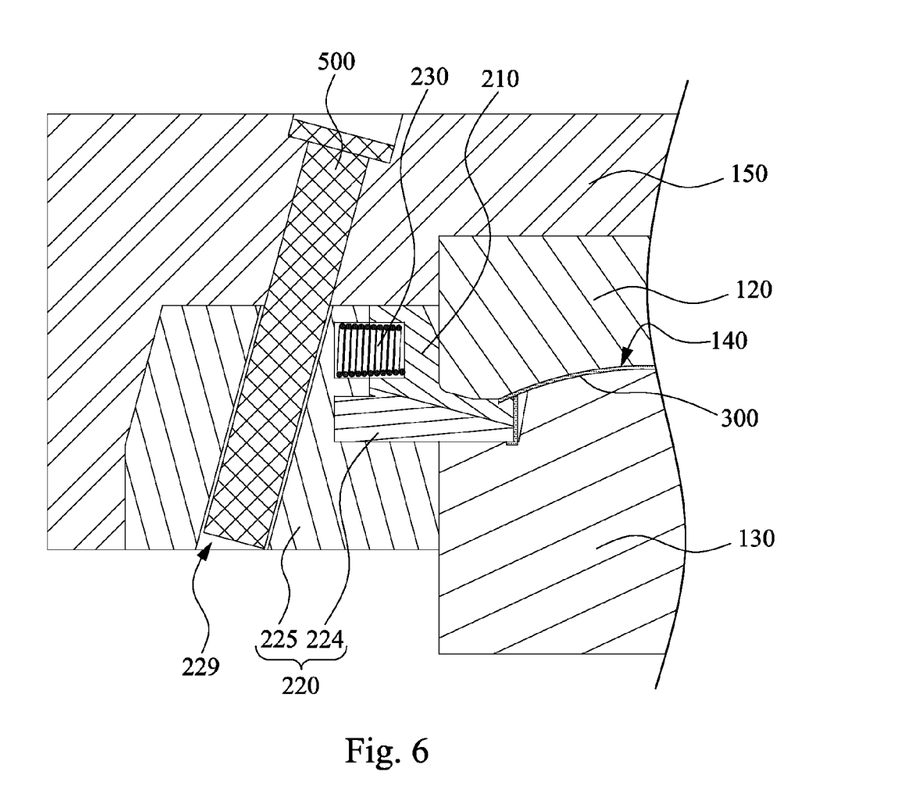
FIG. 6 is a cross sectional view showing the injection-molding device according to another embodiment of the present disclosure, wherein the crossed location being the same as FIG. 3.

FIG. 6 is a cross sectional view showing the injection-molding device 100 according to another embodiment of the present disclosure, wherein the crossed location being the same as FIG. 3. As shown in FIG. 6, the injection-molding device 100 further includes a connection cover 150 and a mold engaging pin 500. The connection cover 150 is used for covering and connecting the female part 120 and the slider body 225. The mold engaging pin 500 passes the connection cover 150 and the slider body 225, and is obliquely disposed in the connection cover 150 and the slider body 225, and the mold engaging pin 500 is inserted in a third pin slot 229 of the slider body 225, the mold engaging pin 500 is enabled to be gradually closer to the female part 120 along a direction defined from the slider body 225 towards the connection cover 150. Because the mold engaging pin 500 passes the connection cover 150 and the slider body 225, the mold engaging pin 500 can limit the horizontal movement of the horizontally-moveable slider 220, so the compressed elastic element 230 remains to be clamped between the vertically-moveable slider 210 and the horizontally-moveable slider 220.

Figure 7:
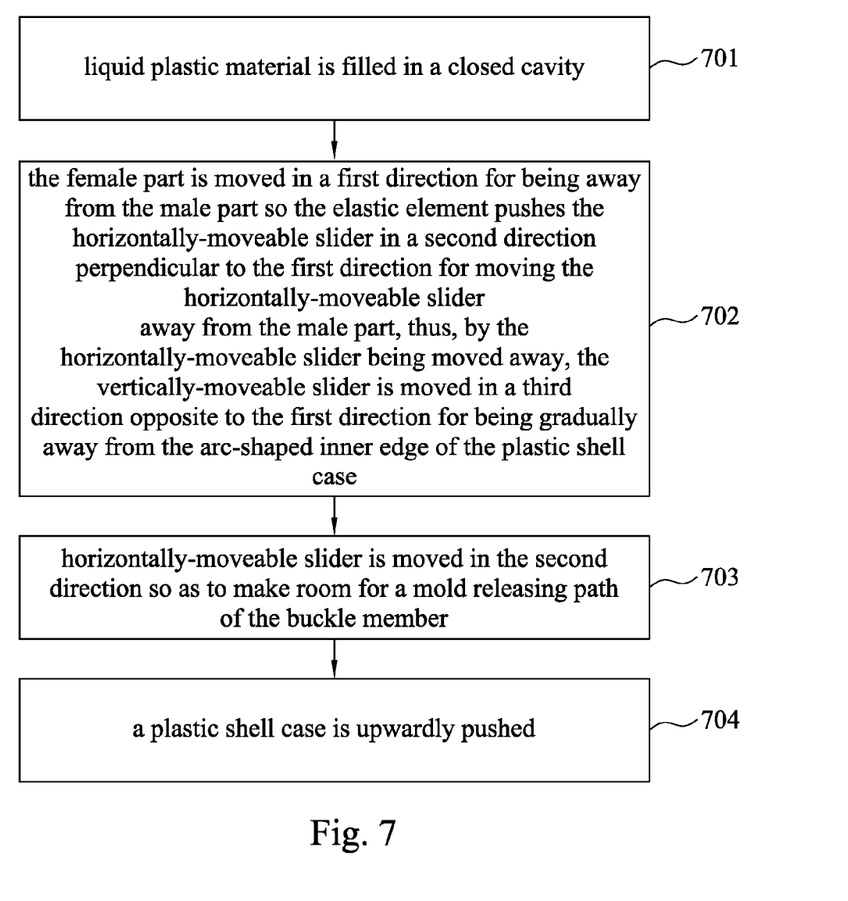
FIG. 7 is a flowchart illustrating the injection-molding device according to another embodiment of the present disclosure.

FIG. 7 is a flowchart illustrating the injection-molding device according to another embodiment of the present disclosure. As shown in FIG. 7, after the injection-molding device enters the above-mentioned mold engaged status, steps are processed as outlined below. In step 701, a liquid (melted) plastic material is filled in the closed cavity. In step 702, the female part is moved in a first direction for being away from the male part, so the elastic element pushes the horizontally-moveable slider in a second direction perpendicular to the first direction for moving the horizontally-moveable slider away from the male part; by the horizontally-moveable slider being moved away, the vertically-moveable slider is moved in a third direction opposite to the first direction for being gradually away from the arc-shaped inner edge of the plastic shell case. In step 703, the vertically-moveable slider is moved in the second direction to make room for a mold releasing path of the buckle member for leaving the insertion groove 130. In step 704, the plastic shell case is upwardly pushed.

In step 701 of the embodiment, as shown in FIG. 6, the liquid plastic material is filled in the closed cavity 140 thereby enabling the plastic shell case 300 (as shown in FIG. 4) to be formed in the closed cavity 140.

Reference is now made to FIG. 8A to FIG. 8D, in which FIG. 8A to FIG. 8D, are schematic views illustrating the operation sequence of the injection-molding device 100 according another embodiment of the present disclosure.

Figure 8A:
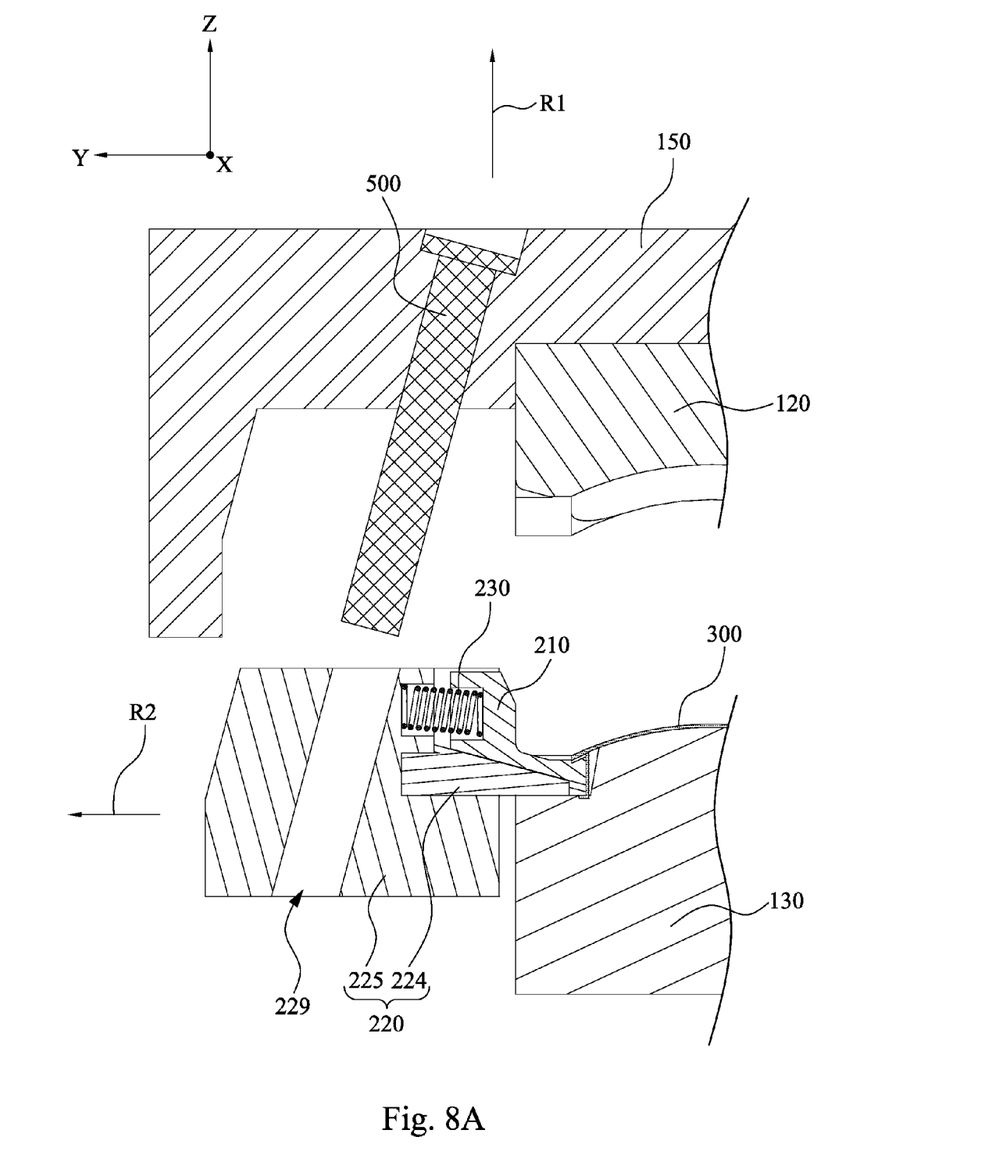
FIG. 8A to FIG. 8D are schematic views illustrating the operation sequence of the injection-molding device according another embodiment of the present disclosure.

In step 702 of the embodiment, as shown in FIG. 8A, the female part 120 is moved towards the first direction R1 (e.g. the +Z axle) for being away from the male part 110; at this moment, through the connection cover 150, the female part 120 allows the mold engaging pin 500 to be simultaneously removed from the slide body 225, so the movement of the horizontally-moveable slider 220 is no longer limited by the mold engaging pin 500; moreover, because the mold engaging pin 500 is obliquely disposed in the slider body 225, when the mold engaging pin 500 is removed towards the first direction R1 (e.g. the +Z axle), the mold engaging pin 500 slightly pushes the slider body 225 in the third pin slot 229 towards the second direction R2 (the Y axle).

Figure 8B:
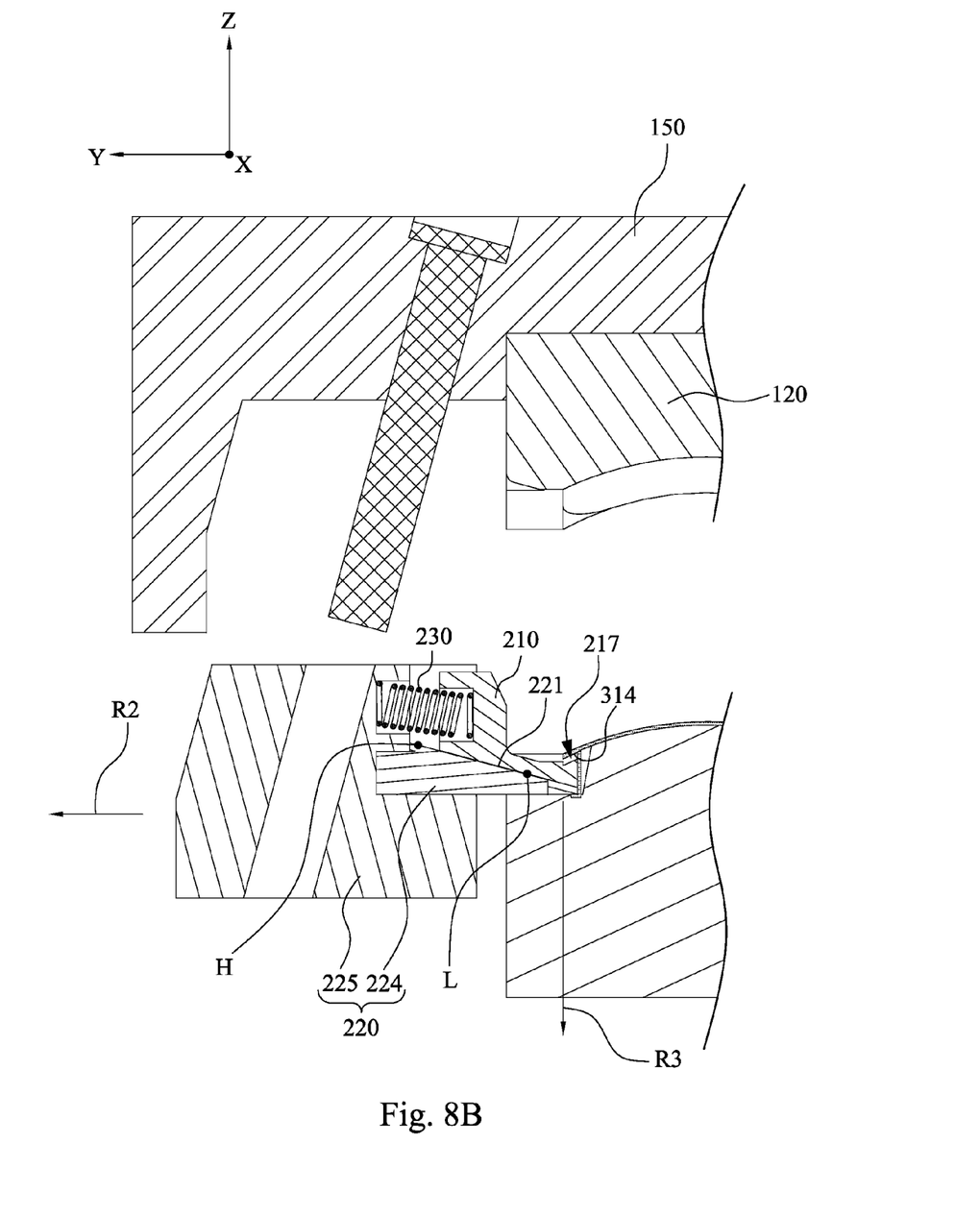

In step 702 of the embodiment, as shown in FIG. 8B, because the movement of the slider body 225 is no longer limited by the mold engaging pin 500, the compressed elastic element 230 pushes the slider body 225 of the horizontally-moveable slider 220, so the horizontally-moveable slider 220 is moved towards the second direction R2 (e.g. the Y axle), meanwhile, with the horizontal movement of the horizontally-moveable slider 220, the vertically-moveable slider 210 is moved from the high point H to the low point L defined on the second inclined plane 221 of the horizontally-moveable slider 220, then the vertically-moveable slider 210 is further moved towards the third direction R3 (e.g. the −Z axle) for being gradually away from the arc-shaped inner edge 314 of the shell member 310. In other words, the recess portion 217 of the vertically-moveable slider 210 is gradually released from the arc-shaped inner edge 314 of the shell member 310. It is noted, since the recess portion 217 of the vertically-moveable slider 210 has already been away from the arc-shaped inner edge 314 of the shell member 310 in the third direction R3 (e.g. the −Z axle), when the vertically-moveable slider 210 is horizontally moved for mold releasing, the arc-shaped inner edge 314 of the shell member 310 no longer interferes the vertically-moveable slider 210.

Figure 8C:
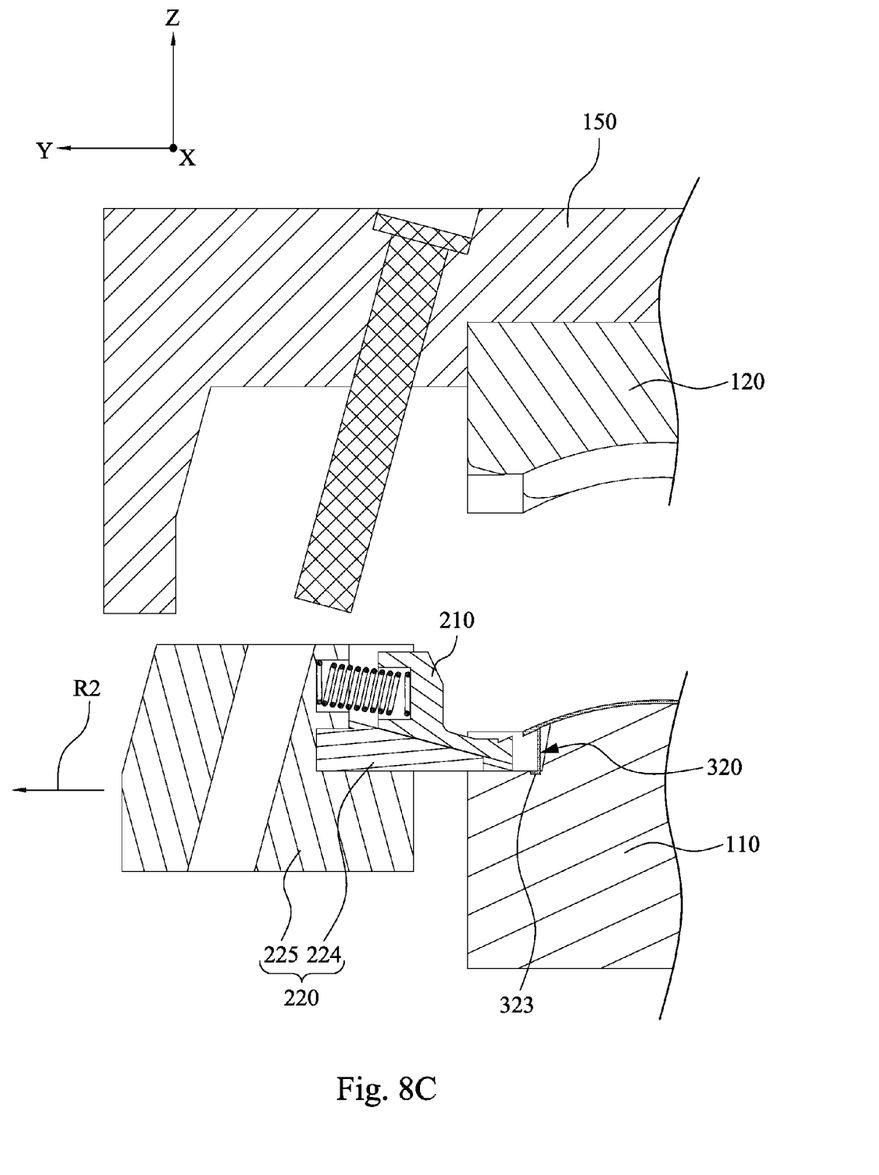

In step 703 of the embodiment, as shown in FIG. 8C, when the horizontally-moveable slider 220 continues to be moved in the second direction R2 (e.g. the Y axle), the vertically-moveable slider 210 linked with the horizontally-moveable slider 220 could be drawn towards the second direction R2 and at least not located above the hook 323 of the buckle member 320, thus, the mold releasing path of the buckle member 320 is shown.

Figure 9:
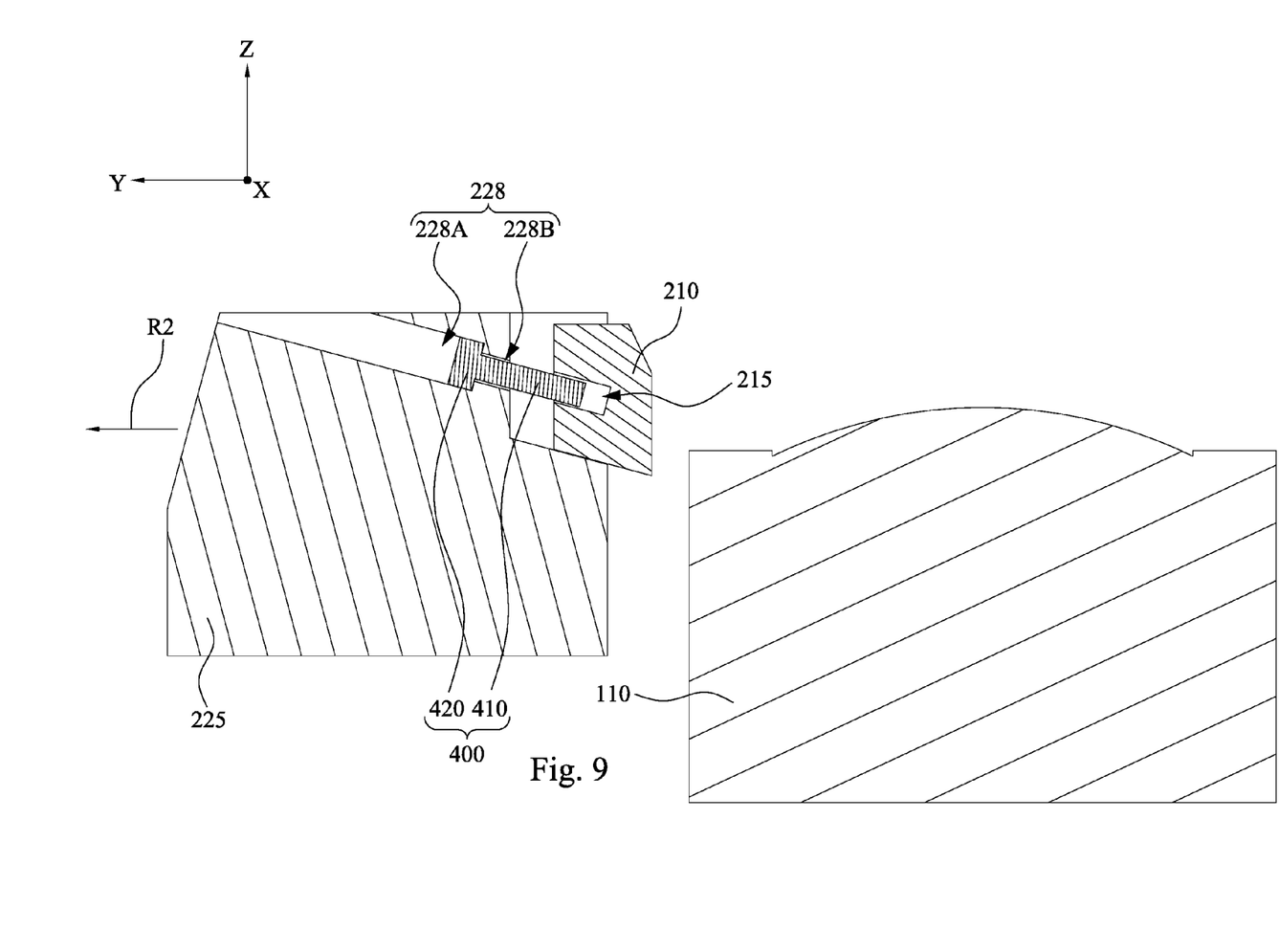
FIG. 9 is a cross sectional view of FIG. 8C, wherein the crossed location being the same as FIG. 5.

FIG. 9 is a cross sectional view of FIG. 8C, wherein the crossed location being the same as FIG. 5. As shown in FIG. 9, in step 703 of the embodiment, because one end of the rod body 410 of the position limiting rod 400 is fastened (e.g. screw-fitted) in the second pin slot 215 of the vertically-moveable slider 210, and the rod head 420 of the position limiting rod 400 is movably limited in the first segment 228A, when the horizontally-moveable slider 220 continues to be moved towards the second direction R2 (e.g. the Y axle), the slider body 225 utilizes the position limiting rod 400 to drive the vertically-moveable slider 210 for being moved towards the second direction R2 (e.g. the Y axle).

Figure 8D:
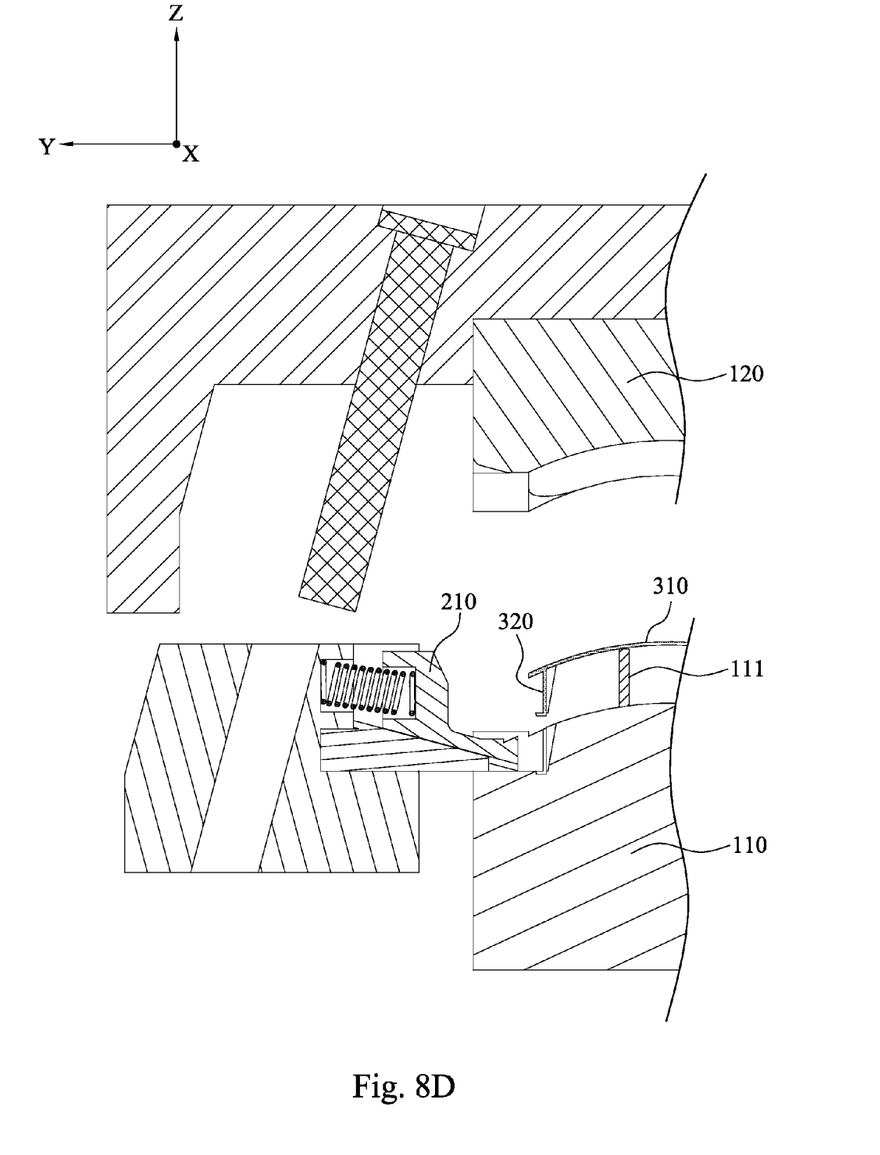

As shown in FIG. 8D, in step 704, because the vertically-moveable slider 210 moves to make room for the mold releasing path of the buckle member 320, a pushing post 111 formed in the male part 110 can protrude from the male part 110 to smoothly lift the plastic shell case 300 for release from the male part 110.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific examples of the embodiments disclosed and that modifications and other embodiments are intended to be included within the scope of the appended claims. Although specific terms are employed herein, they are used in a generic and descriptive sense only and not for purposes of limitation.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An injection molding device, comprising:
   a male part;
   a female part detachably engaged with the male part, wherein sides of the male part and the female part facing a same direction collectively form an insertion groove thereon;
   a vertically-moveable slider detachably inserted in the insertion groove, and formed with a first inclined plane;
   a horizontally-moveable slider detachably inserted in the insertion groove, formed with a second inclined plane being slidably engaged with the first inclined plane, wherein a closed cavity is collectively defined by the vertically-moveable slider, the horizontally-moveable slider, the female part and the male part,
   an elastic element, wherein two opposite ends of the elastic element are respectively abutted against the vertically-moveable slider and the horizontally-moveable slider,
   wherein, after a plastic shell case is formed in the closed cavity and the female part is moved in a first direction to be away from the male part, the elastic element pushes the horizontally-moveable slider in a second direction which is perpendicular to the first direction for allowing the horizontally-moveable slider to be away from the male part, with the horizontally-moveable slider being gradually moved away from the male part, the vertically-moveable slider is gradually moved in a third direction which is opposite to the first direction for being away from an arc-shaped inner edge of the plastic shell case.

2. The injection-molding device according to claim 1, wherein the horizontally-moveable slider comprises:
   a slider body connected to the vertically-moveable slider, wherein the vertically-moveable slider is disposed between the slider body and the female part; and
   a latch member, wherein two opposite ends of the latch member are respectively inserted in the insertion groove and the slider body, and the second inclined plane is formed at one side of the latch member.

3. The injection-molding device according to claim 2, wherein the vertically-moveable slider is formed with a first concave portion, the slider body is formed with a second concave portion, and an accommodation space for accommodating the elastic element is collectively defined by the second concave portion and the first concave portion,
   wherein the opposite ends of the elastic element are respectively abutted against the first concave portion and the second concave portion.

4. The injection-molding device according to claim 2, wherein the vertically-moveable slider comprises:
   an embedding member inserted in the slider body;
   an extension arm convexly formed on one side of the embedding member and extended into the insertion groove; and
   a recess portion formed at one end portion of the extension arm being away from the embedding member,
   wherein, when the plastic shell case is formed in the closed cavity, the arc-shaped inner edge of the plastic shell case is complementary with the recess portion, and is in contact with the recess portion.

5. The injection-molding device according to claim 2, further comprising:
   a connection cover covering the female part and the slider body; and
   a mold engaging pin disposed in the connection cover and the slider body, and the mold engaging pin is gradually adjacent to the female part along a direction defined from the slider body towards the connection cover,
   wherein, when the female part is moved to be away from the male part, with the movement of the female part, the mold engaging pin enables both of the slider body and the latch member to move in the second direction.

6. The injection-molding device according to claim 2, further comprising:
   a position limiting rod obliquely disposed in the vertically-moveable slider and the slider body, wherein one end of the position limiting rod is fixedly connected to the vertically-moveable slider, and the other end of the position limiting rod is moveably limited in the slider body.

7. The injection-molding device according to claim 6, wherein the position limiting rod is formed with a rod body and a rod head, the rod head is formed at one end of the rod body, and a cross sectional width of the rod head is greater than a cross sectional width of the rod body.

8. The injection-molding device according to claim 7, wherein the slider body is formed with a first pin slot, the first pin slot is formed with a first segment and a second segment, and a diameter of the second segment is smaller than a diameter of the first segment and the cross sectional width of the rod head.

9. The injection-molding device according to claim 8, wherein the vertically-moveable slider is formed with a second pin slot, the first pin slot and the second pin slot are coaxial and communicated with each other, wherein the other end of the rod body is secured in the second pin slot, and the rod head is moveably limited in the first segment of the first pin slot.

10. The injection-molding device according to claim 1, wherein the first inclined plane is formed with a first guiding portion and the second inclined plane is formed with a second guiding portion, wherein the first guiding portion is complementary to the second guiding portion and is slidably engaged with the second guiding portion.

* * * * *